United States Patent
Ohta et al.

(10) Patent No.: US 7,992,188 B2
(45) Date of Patent: Aug. 2, 2011

(54) DOCUMENT ACCESS CONTROL SYSTEM, DATA PROCESSING APPARATUS, PROGRAM PRODUCT AND METHOD FOR PERFORMING DOCUMENT ACCESS CONTROL

(75) Inventors: Yusuke Ohta, Kanagawa (JP); Kazuyo Hashimoto, Tokyo (JP); Hiroyuki Minamide, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1041 days.

(21) Appl. No.: 11/627,598

(22) Filed: Jan. 26, 2007

(65) Prior Publication Data

US 2007/0198462 A1  Aug. 23, 2007

(30) Foreign Application Priority Data

Feb. 6, 2006  (JP) .................................. 2006-028495

(51) Int. Cl.
*G06F 17/00* (2006.01)
(52) U.S. Cl. ............... 726/1; 707/694; 705/67; 713/189
(58) Field of Classification Search .............. 707/1, 694; 726/1; 705/67; 713/189
See application file for complete search history.

(56) References Cited

U.S. PATENT DOCUMENTS

| 2005/0108548 A1 | 5/2005 | Ohta | |
|---|---|---|---|
| 2006/0259782 A1* | 11/2006 | Wang et al. | 713/189 |

FOREIGN PATENT DOCUMENTS

| EP | 1 320 014 A2 | 6/2003 |
|---|---|---|
| EP | 1 528 455 A1 | 5/2005 |
| JP | 2003-228520 | 8/2003 |
| JP | 2004-152261 | 5/2004 |
| JP | 2005-141746 | 6/2005 |

* cited by examiner

*Primary Examiner* — David J Pearson
*Assistant Examiner* — Angela Holmes
(74) *Attorney, Agent, or Firm* — Oblon, Spivak, McClelland, Maier & Neustadt, L.L.P.

(57) ABSTRACT

A document access control system for determining whether to allow a client to access a target document file according to a security policy set in a server, the system includes a cache timing determination part for determining the timing for caching policy determination data corresponding to the target document file in the client, a policy determination data obtaining part for obtaining the policy determination data from the server according to a report from the cache timing determination part, a policy determination data storage part for storing the obtained policy determination data in correspondence with the target document file, and a file access control part for controlling access to the target document file according to the policy determination data stored in the policy determination data storage part in a case where the user of the client requests access to the target document file when the client is in an offline mode.

15 Claims, 9 Drawing Sheets

FIG.4

| ENCRYPTED DOCUMENT DATA |
| --- |
| DOCUMENT ID |

FIG.5

| POLICY <DocumentSecurityPolicy> | | | | | | |
|---|---|---|---|---|---|---|
| USER TYPE <DspUser> | | | | | TYPE OF SUBJECT | |
| | DOCUMENT TYPE <DspDoc> | | | | TYPE OF OBJECT | |
| | | ACCESS #1 <DspAccess> | | | TYPE OF ACCESS | |
| | | | CONDITION #1 <DspObligation> | | OBLIGATION ADDED DURING ALLOWANCE | |
| | | | | OFFLINE <OfflineAuthorization> | INCLUDES THIS TAG WHEN OFFLINE ACCESS IS ALLOWED | |
| | | | | | VALID PERIOD <ValidPeriod> | |
| | | | | | VALID COUNT <ValidCount> | |

FIG.6

| SUBJECT |
| --- |
| RESOURCE |
| ACCESS |
| ACCESS AUTHORIZATION (OK or NG) |
| OBLIGATION (CONDITION/OBLIGATION) |
| VALID PERIOD (STARTING DATE, EXPIRATION DATE) |
| VALID COUNT |
| DOCUMENT DECRYPTION KEY |

FIG.7

| SUBJECT |
| --- |
| RESOURCE |
| ACCESS |
| ACCESS TIME |
| ACCESS LOCATION (E.G. CLIENT IP ADDRESS) |
| ACCESS RESULT (SUCCESS or FAILURE) |
| REASON OF FAILURE (E.G. EXCEEDING VALID COUNT) |

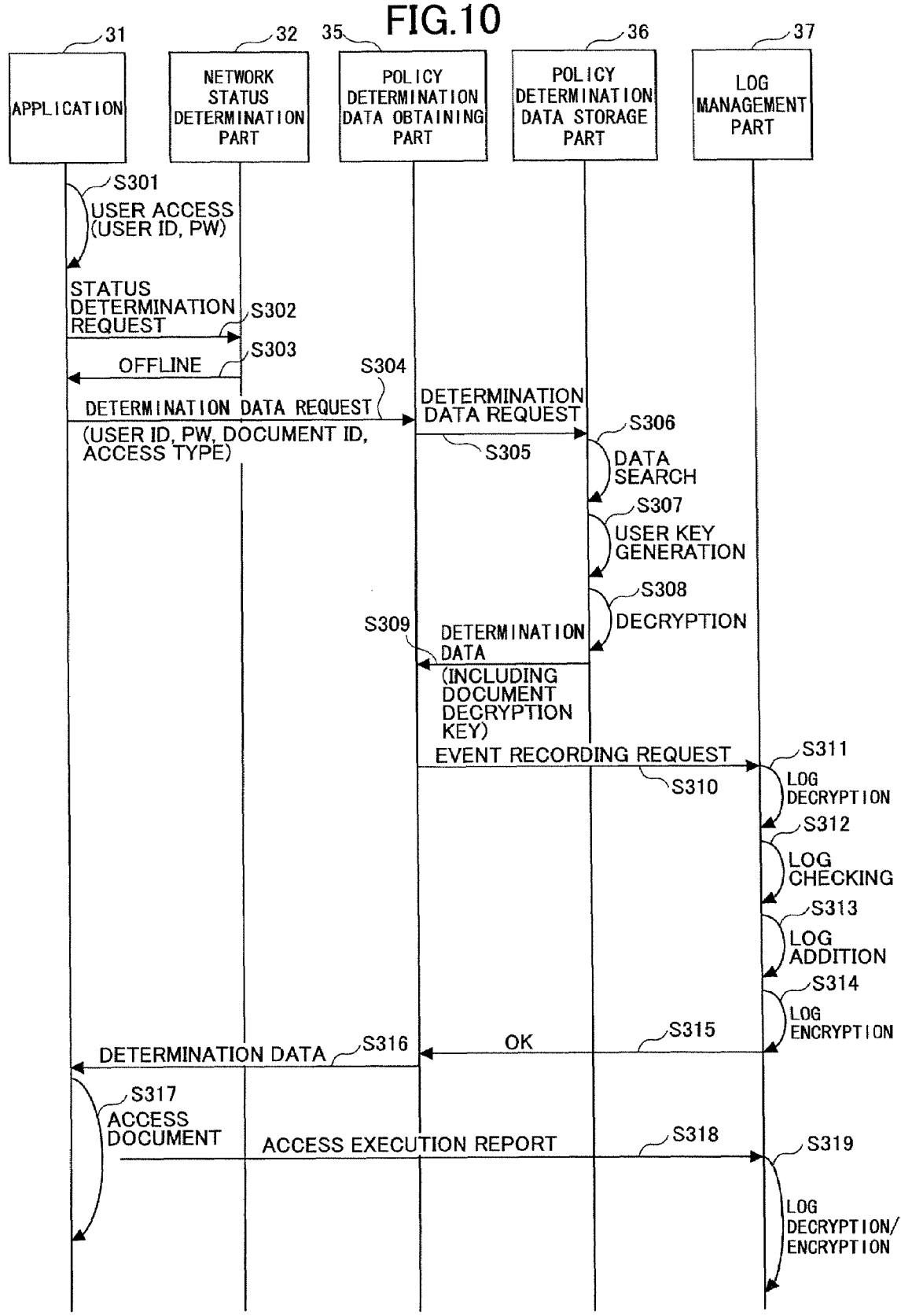

DOCUMENT ACCESS CONTROL SYSTEM,
DATA PROCESSING APPARATUS, PROGRAM
PRODUCT AND METHOD FOR
PERFORMING DOCUMENT ACCESS
CONTROL

BACKGROUND OF THE INVENTION

1. Field of the Invention

The present invention relates to a document access control system, data processing apparatus, a program product and a document access control method, and more particularly to a document access control system, a data processing apparatus, a program product and a document access control method for enabling document access control to be performed even in an offline environment.

2. Description of the Related Art

An access control method according to a related art case is conducted as follows. First, a security policy defining allowance of document access (e.g. browsing, editing, printing) and conditions for access are set to a server beforehand. In a case where the client side wishes to access an encoded document file, a document application of the client queries the server for allowance of access and conditions for access. In a case where the server allows access of the client, the server sends a decoding key to the client for allowing the client to access the document file (for example, see U.S. Pat. Nos. 633,925 and 6,289,450, Japanese Laid-Open Patent Application No. 2004-152261).

With this method, a uniform security policy can be reliably applied to a wide area. However, in an offline environment where the server cannot be accessed, the access authority information of the document file and the decoding key according to the security policy cannot be obtained. Therefore, the document file could not be used in the offline environment.

In order to solve this problem and achieve document access in compliance to the security policy even in an offline environment, there is a method where necessary information is stored in the client side so that offline access can be controlled based on the information stored in the client (for example, see Japanese Laid-Open Patent Application Nos. 2003-228520 and 2005-141746).

However, with this method, the server requires that the document file be opened to trigger the storage of the information necessary for offline access. That is, the document file is to be opened at least once for allowing the necessary information to be cached in the client side. Therefore, in a case where the document file has never been opened, the document file cannot be accessed in an offline environment.

In addition, the method disclosed in Japanese Laid-Open Patent Application No. 2003-228520 does not specifically describe the timing in which the necessary information is stored in the client. This method has a decryption key included in the document file so that access can be controlled depending on whether the decryption key can be extracted from the document file. This method is significantly different from the document protecting method of the below-described document access control system according to an embodiment of the present invention which does not include the decryption key in the document file.

The same as the method disclosed in Japanese Laid-Open Patent Application No. 2003-228520, the method disclosed in Japanese Laid-Open Patent Application No. 2005-141746 also has a decryption key included in the document file so that access can be controlled depending on whether the decryption key can be extracted from the document file. This method is also significantly different from the document protecting method of the below-described document access control system according to an embodiment of the present invention.

Meanwhile, as methods according to a related art case for allowing data to be used offline on the premise that the data are used online, there are, for example, a function of locally caching the contents of a page once accessed by a Web browser of a client's PC (personal computer), a function of periodically caching the content of a pre-registered Web page, a file cache function of allowing a file in a file server to be used even in an offline mode, or a replication function of locally copying the content of a DB (Data Base) in a network.

However, these functions are merely methods of locally copying the contents that can be accessed online and are for allowing the basically same operation to be performed in an online mode and an offline mode. Thus, these functions do not serve to control access to the contents (more specifically, there is no difference in operation between the online mode and the offline mode).

SUMMARY OF THE INVENTION

The present invention may provide a document access control system, data processing apparatus, a program product and a document access control method that substantially obviate one or more of the problems caused by the limitations and disadvantages of the related art.

For example, an embodiment of the present invention may (1) enable access to a document file which has not yet been subject to an explicit action (e.g. opening of file) by the user (client) based on a predetermined authority even in an offline mode (e.g. when the server of the client is shut down), (2) change security level between an online mode and an offline mode (e.g. allowing browsing and printing during an online mode but allowing only browsing during an offline mode), and (3) prevent unauthorized access by tampering with data cached in a client.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a document access control system, data processing apparatus, a program product and a document access control method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a document access control system for determining whether to allow a client to access a target document file according to a security policy set in a server, the system including: a cache timing determination part for determining the timing for caching policy determination data corresponding to the target document file in the client; a policy determination data obtaining part for obtaining the policy determination data from the server according to a report from the cache timing determination part; a policy determination data storage part for storing the obtained policy determination data in correspondence with the target document file; and a file access control part for controlling access to the target document file according to the policy determination data stored in the policy determination data storage part in a case where the user of the client requests access to the target document file when the client is in an offline mode.

Furthermore, another embodiment of the present invention provides a data processing apparatus for determining whether to allow client access to a target document file according to a security policy set in a server, the apparatus including: a cache timing determination part for determining the timing for caching policy determination data corresponding to the target document file in the client; a policy determination data obtaining part for obtaining the policy determination data from the server according to a report from the cache timing determination part; a policy determination data storage part for storing the obtained policy determination data in correspondence with the target document file; and a file access control part for controlling access to the target document file according to the policy determination data stored in the policy determination data storage part in a case where the user of the client requests access to the target document file when the client is in an offline mode.

Furthermore, another embodiment of the present invention provides a program product on which a computer-readable program is stored for causing a computer to perform a document access control method for determining whether to allow a client to access a target document file according to a security policy set in a server, the method including the steps of: a) determining the timing for caching policy determination data corresponding to the target document file in the client; b) obtaining the policy determination data from the server according to a report generated in step a); c) storing the obtained policy determination data in correspondence with the target document file; and d) controlling access to the target document file according to the policy determination data stored in step c) in a case where the user of the client requests access to the target document file when the client is in an offline mode.

Furthermore, another embodiment of the present invention provides a document access control method for determining whether to allow a client to access a target document file according to a security policy set in a server, the method including the steps of: a) determining the timing for caching policy determination data corresponding to the target document file in the client; b) obtaining the policy determination data from the server according to a report generated in step a); c) storing the obtained policy determination data in correspondence with the target document file; and d) controlling access to the target document file according to the policy determination data stored in step c) in a case where the user of the client requests access to the target document file when the client is in an offline mode.

Other objects and further features of the present invention will be apparent from the following detailed description when read in conjunction with the accompanying drawings.

BRIEF DESCRIPTION OF THE DRAWINGS

FIG. 4 is a schematic diagram showing an exemplary configuration of an encrypted document file according to an embodiment of the present invention;

FIG. 5 is a schematic diagram showing an exemplary configuration of a security policy managed by the security policy server 1 according to an embodiment of the present invention;

FIG. 6 is a table showing an exemplary configuration of policy determination data according to an embodiment of the present invention;

FIG. 7 is a table showing an exemplary configuration of a monitor log according to an embodiment of the present invention;

FIG. 10 is a sequence diagram showing an exemplary operation of making access (accessing) to a target document file during an offline mode according to an embodiment of the present invention.

DESCRIPTION OF THE PREFERRED EMBODIMENTS

In the following, embodiments of the present invention are described with reference to the accompanying drawings.
[System Configuration]

Figure 1:
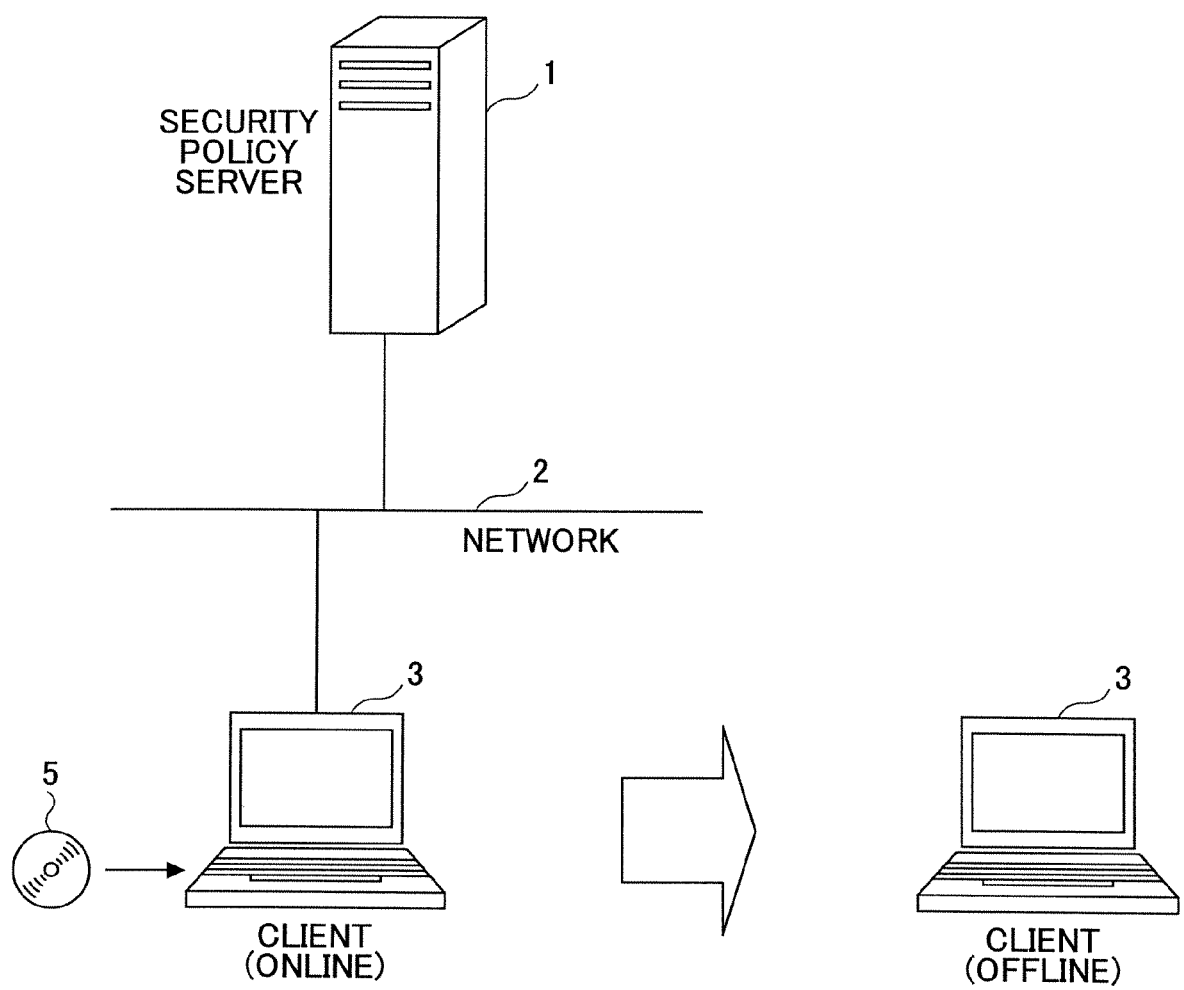
FIG. 1 is a schematic diagram showing an exemplary configuration of a document access control system according to an embodiment of the present invention.

FIG. 1 is a schematic diagram showing an exemplary configuration of a document access control system 100 according to an embodiment of the present invention. In the document access control system 100 shown in FIG. 1, a security policy server 1 for managing security policy is provided in a network 2. Furthermore, a client (e.g. data processing apparatus) 3 becomes online by connecting to the network 2 and becomes offline by disconnecting from the network 2. It is to be noted that the network 2 is not limited to a wire-connected network. The network 2 may also be a wireless network. The client 3 includes, for example, a personal computer (PC), a PDA (Personal Digital Assistant), and/or a portable telephone. Furthermore, a program for causing the client 3 to perform the below-described document access control method of the present invention may be loaded to the client 3 via the network 2 or a computer-readable medium 5 on which the program is stored.

Figure 2:
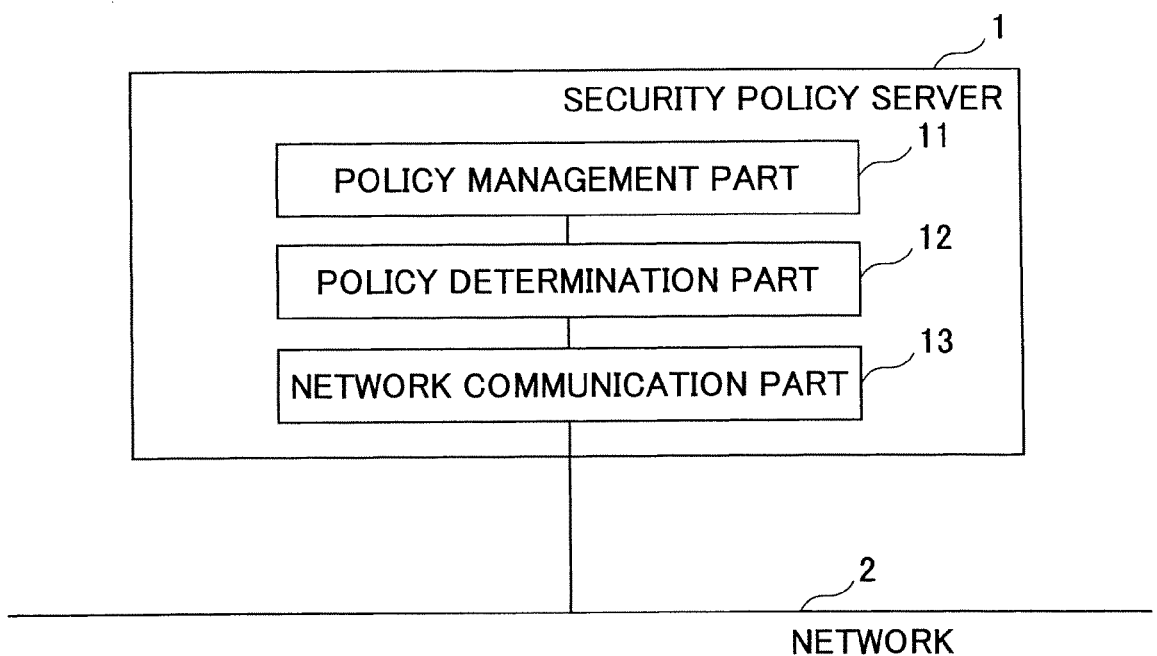
FIG. 2 is a schematic diagram showing an exemplary configuration of the inside of a security policy server according to an embodiment of the present invention.

FIG. 2 is a schematic diagram showing an exemplary configuration of the inside of the security policy server 1 according to an embodiment of the present invention. In FIG. 2, the security policy server 1 includes a policy management part 11 for managing security policy, a policy determination part 12 for generating policy determination data based on the security policy of the policy management part 11 and reporting the generated policy determination data to the client 3, and a network communication part 13 for conducting network communications.

Figure 3:
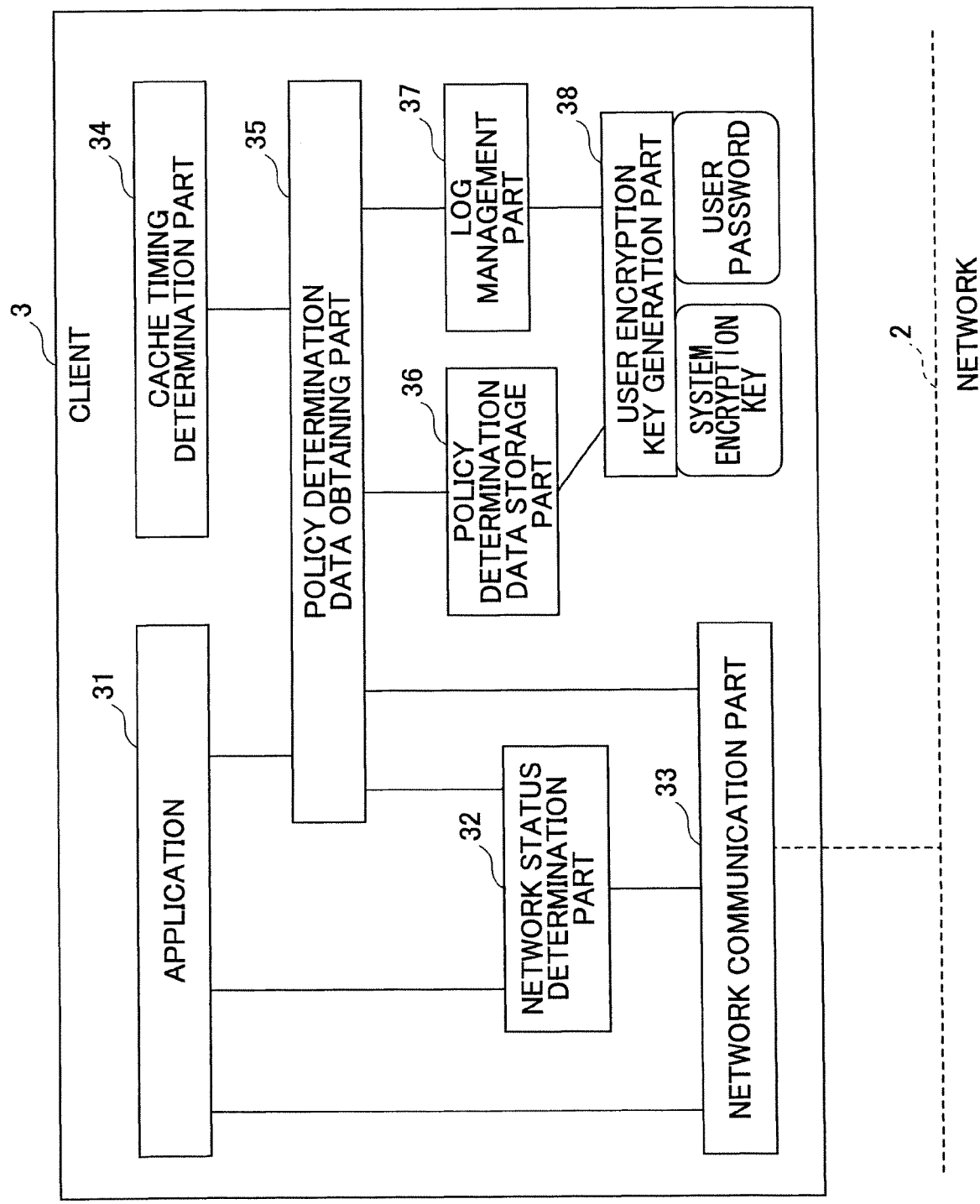
FIG. 3 is a schematic diagram showing an exemplary configuration of the inside of the client according to an embodiment of the present invention.

FIG. 3 is a schematic diagram showing an exemplary configuration of the inside of the client 3. In FIG. 3, the client 3 includes an application 31, a network status determination part 32, a network communication part 33, a cache timing determination part 34, a policy determination data obtaining part 35, a policy determination data storage part 36, a log management part 37, and a user encryption key generation part 38. The function for each part is described below.

The application 31 functions as an interface when a user accesses (e.g. browsing, printing, editing) an encrypted document file. The application 31 is configured, for example, as a Plug-in of Adobe Acrobat (Registered Trademark). When the application 31 receives an instruction to access a file (file access instruction) from the user, the application 31 requests the user to input a user ID and a password required for accessing the security policy server 1. Furthermore, the application 31 queries the network status determination part 32 whether the client 3 is online or offline. In a case where the client 3 is online, the application 31 transmits the user ID and the password to the policy determination part 12 of the security policy server 1 via the network communication part 33 and requests for policy determination data including access rules corresponding to the target document file and the user. Then, the application 31 requests the policy determination data obtaining part 35 to cache the policy determination data of the corresponding target document file. In a case where the client 3 is offline, the application 31, along with transmitting the user ID and password, requests for policy determination data from the policy determination data obtaining part 35 and conducts access control in accordance with the content of the policy determination data. That is, the application 31 controls access to a target document file according to corresponding policy determination data obtained from the policy determination data storage part 36 via the policy determination data obtaining part 35 in a case where the user of the client 3 requests access to the target document file when the client 3 is in an offline mode.

The network status determination part 32 determines whether the client 3 is capable of communicating with the security policy server 1 (online mode) or incapable of communicating with the security policy server 1 (offline mode) via the network communication part 33.

The network communication part 33 is for communicating with the security policy server 1.

The cache timing determination part 34 reports to the policy determination data obtaining part 35 to generate and update data when the client 3 is in an online mode. More specifically, the cache timing determination part 34 preferably includes a "file monitoring function" for monitoring generation (including copying from outside) of the target document file by the client 3 (e.g., may use file monitoring technology of anti-virus software), a "time measuring function" for instructing update of policy determination data at predetermined intervals of time (e.g., this function may be realized with a common timer function), and a "file designating function" for specifically designating a target document file (e.g., this function may be realized by designating with a menu obtained by right-clicking "Explorer" of Windows®). It is however to be noted that one or more of the above-described functions may be included in the cache timing determination part 34 and that all of the above-described functions do not have to be included in the cache timing determination part 34.

The policy determination data obtaining part 35, during an online mode, requests for policy determination data of a target document file from the policy determination part 12 of the security policy server 1 in accordance with instructions from the application 31 or the cache timing determination part 34 and sends the policy determination data obtained from the policy determination part 12 to the policy determination data storage part 36. The policy determination data obtaining part 35, during an offline mode, requests for corresponding policy determination data from the policy determination data storage part 36 in accordance with requests from the application 31 and sends the policy determination data to the application 31 if a predetermined condition (e.g., valid period, valid count) is satisfied. The valid period and the valid count serve to prevent a client 3 (user) from maliciously continuing to use the offline mode (e.g. continuous use in an offline mode even after the determination of the security policy server 1 is changed to denial of access). In the offline mode, the policy determination data obtaining part 35 orders the log management part 37 to conduct recording in a monitor log. Furthermore, after the client 3 returns to an online mode from the offline mode, the policy determination data obtaining part 35 requests the log management part 37 to store the monitor log recorded during an offline mode. Then, the policy determination data obtaining part 35 transmits the obtained monitor log to the security policy server 1 via the network communication part 33.

The policy determination data storage part 36 stores policy determination data obtained from the security policy server 1. In a case where a valid count is set for the policy determination data, the value of the valid count is counted down (decremented) a notch each time the policy determination data are used. It is preferable to have the policy determination data stored in a state encrypted with a "user encryption key". The user encryption key generation part 38 may generate the user encryption key based on, for example, a "system encryption key" stored in a secure hardware device (e.g., secure memory, TPM (Trusted Platform Module)) and a password input by the user.

The log management part 37, in accordance with an order from the policy determination data obtaining part 35, records an event(s) of access made to a target document file during an offline mode to the monitor log. The event (event data) recorded in the monitor log may include time data. Accordingly, whenever an event of access occurs during an offline mode, the log management part 37 may compare the present time data and the most recent time of an event. In a case where there is a contradiction in the time of events according to the comparison, the log management part 37 may transmit an error signal since there is a possibility of unauthorized access being gained by tampering with the time. It is preferable to have the monitor log stored in a state encrypted with, for example, a "system encryption key" stored in a secure hardware device (e.g., secure memory, TPM (Trusted Platform Module)).

The user encryption key generation part 38 generates a user encryption key based on, for example, a system encryption key and a password.

Figure 4:
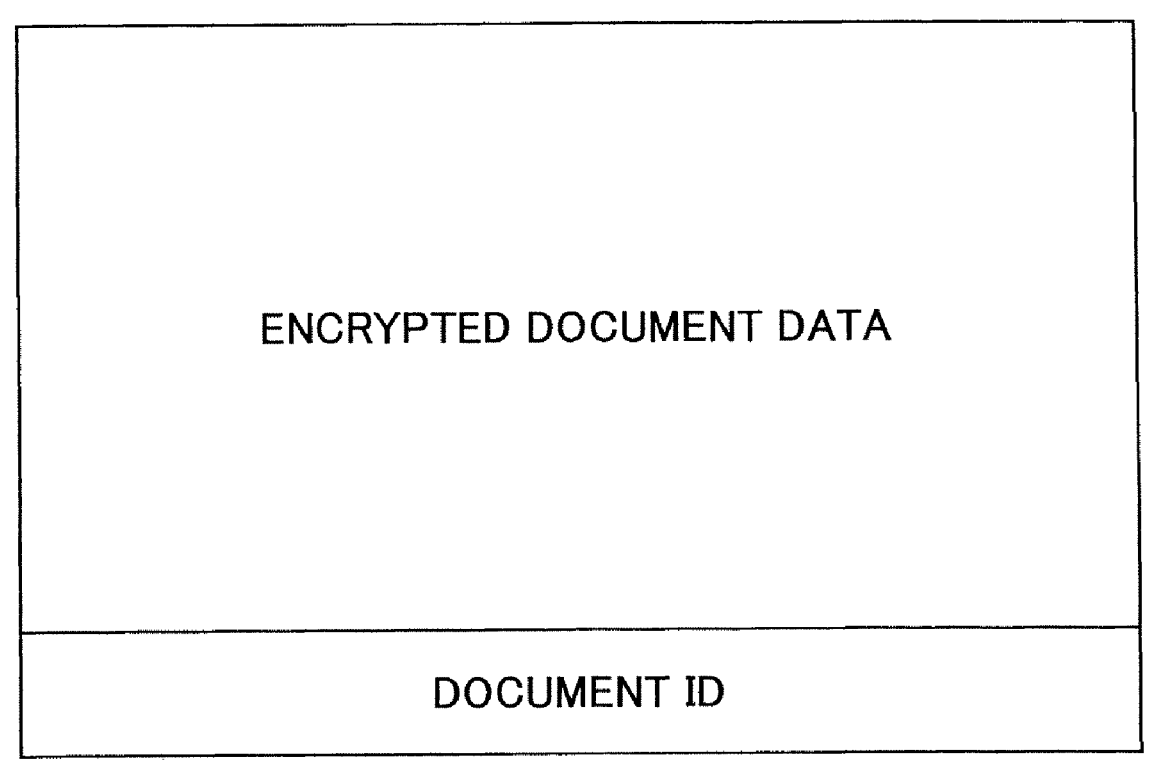

FIG. 4 is a schematic diagram showing an exemplary configuration of an encrypted document file according to an embodiment of the present invention. The target document file, which is subject to access control, includes encrypted document data and a document ID. The encrypted document data are encrypted beforehand with an encryption key dedicated to the document file. It is to be noted that the security policy server 1 manages data for decrypting the uniquely encrypted data (decryption key) in correspondence with the document ID of the document data. The decryption data are included in the policy determination data generated by the security policy server 1 in accordance with requests from the policy determination data obtaining part 35. For example, the encrypted document file may be generated as an encrypted PDF (Portable Document Format) file.

FIG. 5 is a schematic diagram showing an exemplary configuration of a security policy managed by the security policy server 1 according to an embodiment of the present invention. In this example, the security policy is expressed with XML (extensible Markup Language). In the exemplary configuration shown in FIG. 5, a tag "<Document Security Policy>" corresponding to security policy is indicated at a top part. Furthermore, the exemplary configuration shown in FIG. 5 also includes a tag "<DspUser>" corresponding to type of user (type of Subject), a tag "<DspDoc>" corresponding to type of document (type of Object), a tag "<DspAccess>" corresponding to access (type of Access), and a tag "<DspObligation>" corresponding to obligation (obligation added upon allowance).

It is to be noted that the configuration of the security policy may also include a tag "<Offline Authorization>" for designating whether to allow access during an offline mode. Thereby, the manager of the security policy (i.e. security policy server) can designate a document file allowed to be used during an offline mode and designate a document file prohibited to be used during an offline mode. Furthermore, even in a case where a document file is allowed to be used during an offline mode, the period of using the document file or the number of times of using the document file may be controlled by including a tag "<ValidPeriod>" and a tag "<ValidCount>" in the security policy. In FIG. 5, the tag "<OfflineAuthorization>" is indicated in parallel with the tag "<Dsp Obligation>" having the tags "<ValidPeriod>" and "<ValidCount>" included therein.

FIG. 6 is a schematic diagram showing an exemplary configuration of policy determination data generated by the security policy server 1 in accordance with a request from the client 3. A single unit of the policy determination data (policy determination data item) comprises a combination of items including "Subject (user of the security policy server 1)" data, "Resource (Document ID or device ID)" data, and "Access (Process)" data. Furthermore, items such as "Access Authorization (Yes or No)" data, "Obligation (Condition/Obligation)" data, "Valid Period (Starting Date, Expiration Date)" data, "Valid Count" data, and "Document Decryption Key" data may also be included in correspondence with each unit of the policy determination data (policy determination data item). In a case of policy determination data that cannot be accessed (access prohibited policy determination data), the policy determination data do not have to include items other than "Subject" data, "Resource" data, "Access (Process)" data, and "Access Authorization (Yes or No)".

FIG. 7 is a schematic diagram showing an exemplary configuration of a monitor log (offline access log) according to an embodiment of the present invention. More specifically, the monitor log shown in FIG. 7 is stored in the client 3 during an offline mode and is uploaded to the security policy server 1 the next time the client 3 accesses the security policy server 1 during an online mode. The monitor log includes items such as, "Subject" data, "Resource" data, "Access" data, "Access Time" data, "Access Location (e.g., IP address of client 3)" data, "Access Result (Success or Failure)" data, and "Reason of Failure (e.g., Exceeding "valid count")" data.

[Operation Overview]

With a document access control system according to a related art case, the document access control system could only be operated in an online mode and could not be operated in an offline mode. However, the above-described document access control system according to an embodiment of the present invention can also be operated in an offline mode. In other words, a basic operation of the above-described document access control system of the present invention is performed by caching policy determination data (data required for accessing a document file) in the client during an online mode and referring to the cached data during an offline mode. It is to be noted that the operation of "caching" includes a series of processes including obtaining policy determination data from the security policy server 1 by using the policy determination data obtaining part 35 and storing the obtained policy determination data in the policy determination data storage part 36.

With a document access control system according to a related art case, a document file is encrypted beforehand for preventing unauthorized access to the document file and the decryption key of the document file may be obtained from a server during an accessible period (online mode). However, with the document access control system according to an embodiment of the present invention, the decryption key of the target document file is included in the policy determination data cached in the client 3.

Furthermore, with a document access control system according to a related art case, a server stores a monitor log recording events of access made to its document files (access events) based on reports transmitted during an online mode from its client for the purpose of detecting unauthorized access. In the document access control system according to an embodiment of the present invention, since monitor log cannot be uploaded to its server during an offline mode, the events of access made to the server during an offline mode are stored in the monitor log of the client 1. Then, the monitor log(s) including the access events is uploaded as a whole to the security policy server 1.

[Operation of Accessing Target Document File During an Online Mode]

Figure 8:
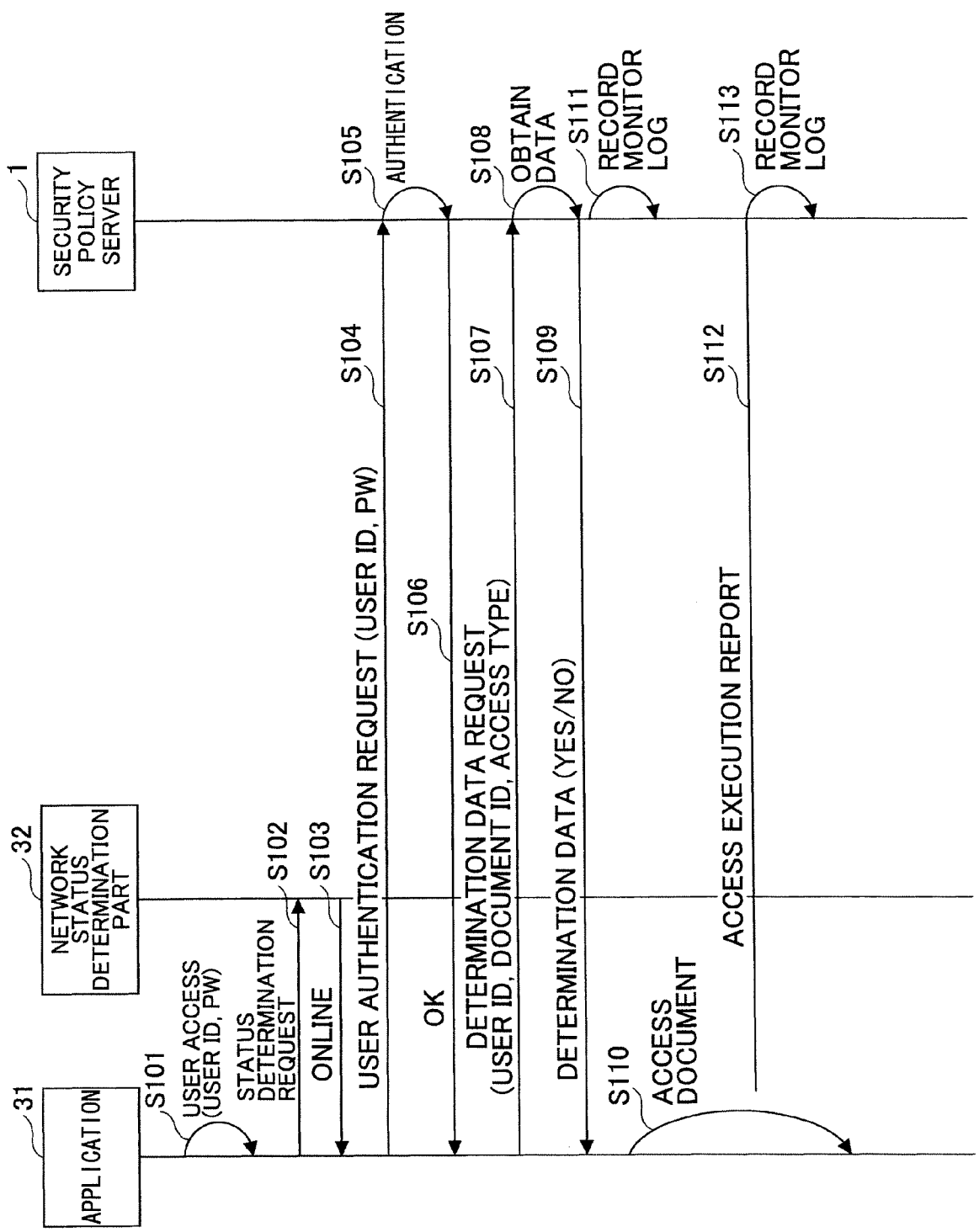
FIG. 8 is a sequence diagram showing an exemplary operation of making access (accessing) to a target document file during an online mode according to an embodiment of the present invention.

FIG. 8 is a sequence diagram showing an exemplary operation of accessing a target document file during an online mode according to an embodiment of the present invention.

In FIG. 8, in a case where the user attempts to access (e.g., browse, edit, print) the target document file with the client 3, the application 31 requests the user to input the user's user ID and password with respect to the security policy server 1 and acquires the input user ID and password (Step S101).

The application 31 requests the network status determination part 32 to determine the status of the network 2 (Step S102). In a case where the application 31 receives a response from the network status determination part 32 that the client 3 is in an online mode (Step S103), the application 31 sends a request for user authentication together with a user ID and a password to the security policy server 1 (Step S104). If the user ID and the password are verified, the security policy server 1 conducts user authentication (Step S105) and sends a reply indicating that the user authentication is properly conducted (Step S106).

Then, the application 31 extracts a document ID embedded in a target document file and sends a request for policy determination data together with user ID, document ID, and type of access to the security policy server 1 (Step S107). The security policy server 1 searches for and obtains data corresponding to the request (Step S108). Then, the security policy server 1 generates policy determination data in accordance with the obtained data and sends the policy determination data to the client 3 (Step S109). The policy determination data include, for example, access authorization data (Yes or No) with respect to the type of access, additional obligation data or decryption key data of the target document file in a case where access is authorized.

The application 31 executes access (user access) to the target document file in accordance with the policy determination data received from the security policy server 1 (Step S110).

After sending the policy determination data, the security policy server 1 records authentication results and generated policy determination data in the monitor log (Step S111). Furthermore, the application 31 reports the execution of accessing the target document file (access event) to the security policy server 1 (Step S112). The security policy server 1 records the access event in the monitor log (Step S113).

[Operation of Caching Policy Determination Data During an Online Mode]

The client 3 performs an operation of caching policy determination data (caching operation) at a predetermined timing. The client 3 performs the caching operation and the above-described accessing operation separately. The caching operation is an operation of storing policy determination data for all of the types of access into a storage area (e.g. HDD (Hard Disk Drive)) of the client 3 in correspondence with all or a user designated document file of the client 3.

In order to prevent the policy determination data corresponding to a target document file(s) from becoming outdated, the predetermined timing for performing the caching operation and the policy determination data to be cached may be one or more of the following timings and data. Although it is preferable to perform the caching operation at all of the below-described timings, the caching operation may be performed at one or more of the timings.

(1) When a target document file(s) is generated in the client 3 (including a case where the target document file is copied). In this timing, the policy determination data to be cached is policy determination data corresponding to the generated target document file.

(2) At predetermined intervals. In this timing, the policy determination data to be cached are policy determination data corresponding to all of the target document files.

(3) When the user explicitly instructs that all cached data are to be updated. In this timing, the policy determination data to be cached are policy determination data corresponding to all of the target document files.

(4) When the user explicitly instructs that cached policy determination data corresponding to a designated document file is to be updated. In this timing, the policy determination data to be cached are policy determination data corresponding to the designated document file. Alternatively, a folder may be designated instead of designating a document file(s), so that the policy determination data to be cached may be policy determination data corresponding to all of the document files included in the designated folder.

(5) When the user accesses a target document file. In this timing, the policy determination data to be cached are policy determination data corresponding to the document file accessed by the user.

Although the content of the policy determination data to be cached may be the same as the policy determination data returned from the security policy server 1 during an online mode, the content of the policy data to be cached may also be different from the content of the policy determination data returned from the security policy server 1 during an online mode. For example, stricter restrictions may be added with respect to policy determination data to be cached during an offline mode. More specifically, enforcing to attach the user name to documents in a printing process during the offline mode or restricting the period/number of times of executing offline access.

In a case where the client 3 requests for policy determination data from the security policy server 1 based on its cached data, the client 3 is required to show a corresponding user ID and a corresponding password to the security policy server 1. Although it may be possible for the security policy server 1 to request the user to input the user ID and the password at the timing when the user accesses a target document file or when the user explicitly designates a predetermined document file, such input cannot be expected in a case where the caching operation is executed at the timing when the target document file is generated or in a case where the caching operation is executed at the predetermined intervals. Therefore, it is preferable to have necessary user ID and password stored in the client 3 beforehand. In this case, it is preferable to store the user IDs and passwords in a place in the client 3 that can only be accessed by a logged-in user. This prevents an unauthorized user from using the user ID and password.

Figure 9:
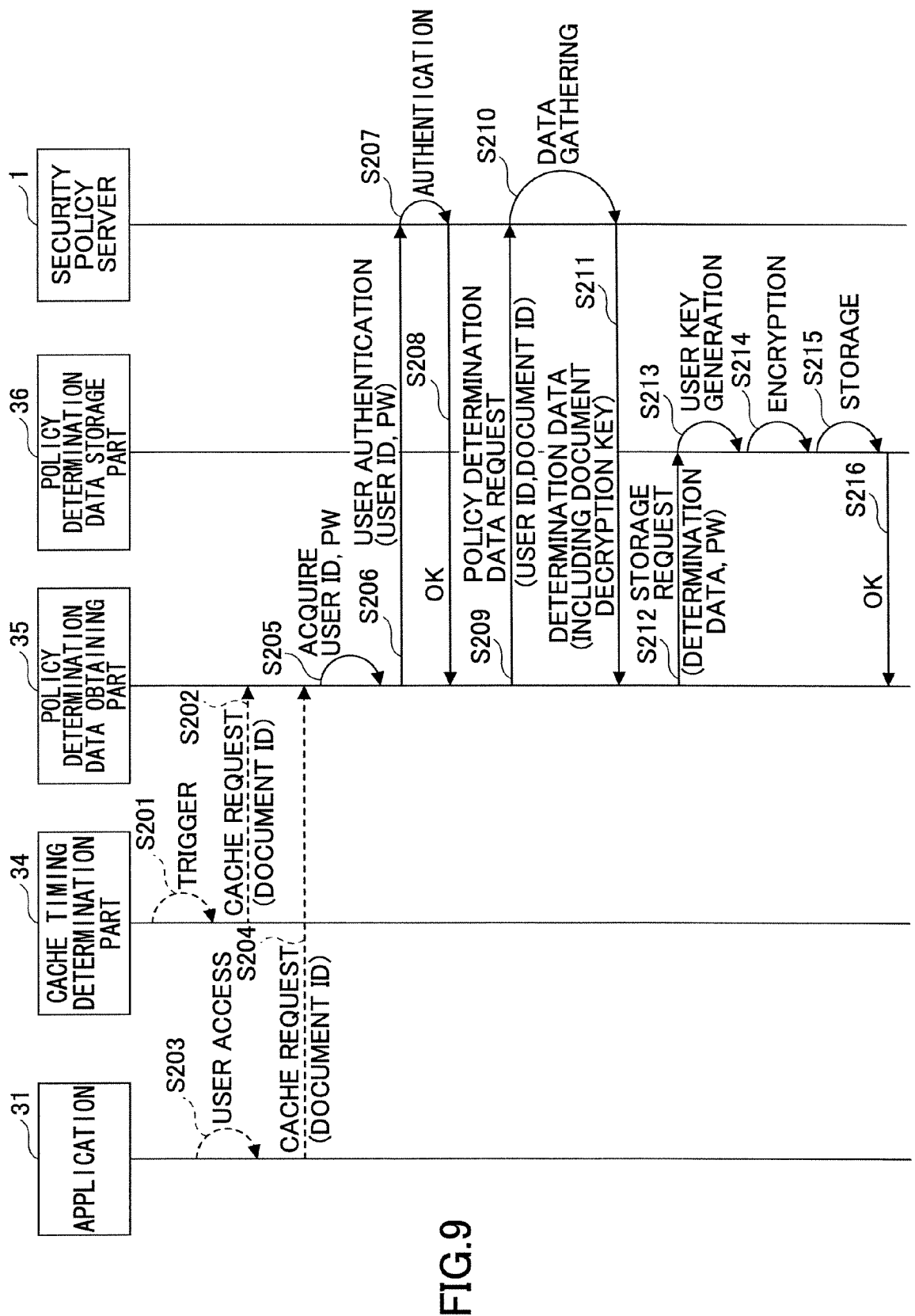
FIG. 9 is a sequence diagram showing an exemplary operation of caching policy determination data during an online mode according to an embodiment of the present invention.

FIG. 9 is a sequence diagram showing an exemplary operation of caching policy determination data during an online mode.

In FIG. 9, the caching operation may be initiated when the cache timing determination part 34 releases a trigger at a predetermined timing (Step S201) and sends a caching request (together with document ID) to the policy determination data obtaining part 35 (Step S202). The caching operation may also be initiated when the application 31 executes user access to a document file (Step S203) and sends a caching request (together with document ID) to the policy determination data obtaining part 35 (Step S204).

Then, the policy determination data obtaining part 35 acquires a user ID and a password (Step S205). In a case of initiating the caching operation independent from actions (e.g. instructions) of the user, the policy determination data obtaining part 35 acquires the user ID and password from a part of the client 3 where user IDs and passwords are stored. In a case of initiating the caching operation in accordance with actions (e.g. instructions) of the user, the policy determination data obtaining part 35 may request the user to input the user ID and password. Then, the policy determination data obtaining part 35 sends a request for user authentication together with the acquired user ID and password to the security policy server 1 (Step S206). Then, the security policy server 1 conducts the user authentication (Step S207). If the user authentication is properly conducted, the security policy server 1 sends a reply indicating that the user authentication has been properly conducted (Step S208).

Then, the policy determination data obtaining part 35 requests for policy determination data from the security policy server 1 (Step S209). The security policy server 1 gathers data corresponding to the request (Step S210). Then, the security policy server 1 generates policy determination data in accordance with the gathered data and sends the policy determination data to the policy determination data obtaining part 35 (Step S211).

The policy determination data obtaining part 35 requests the policy determination data storage part 36 to store the policy determination data (Step S212). Accordingly, the policy determination data storage part 36 generates a user key, encrypts the policy determination data with the user, and stores the encrypted policy determination data (Steps S213-S215). Then, the policy determination data storage part 36 reports that storage of the policy determination data is completed to the policy determination data obtaining part 35 (Step S216).

[Operation of Accessing Target Document File During an Offline Mode]

In a case where the client 3 is disconnected from the network 2 or in a case where the security policy server 1 is shut down, the application 31 of the client 3 cannot request for policy determination data from the security policy server 1. In these cases, the client 3 can refer to cache data stored during an online mode in a storage part of the client 3. By referring to the cache data, access control can be conducted in the same manner as the access control during an online mode. It is however to be noted that allowance of access during an offline mode cannot be determined in a case where policy determination data corresponding to a target document file is not cached in the client 3 (e.g. a case where policy determination data corresponding to the target document file is not cached owing to the client 3 not being online (i.e., connected to the server 1) since the target document file has been generated by the client 3.

Furthermore, access events which are reported to the security policy server 1 during an online mode are stored temporarily in a storage part of the client 3 during an offline mode. The monitor log with the access events recorded is transmitted to the security policy server 1 the next time the client 3 accesses the security policy server 1 during an online mode. By recording access events in the monitor log and transmitting the monitor log to the security policy server 1, unauthorized access can be prevented.

However, there still is a possibility that the policy determination data or the monitor log stored in the client 3 is changed intentionally for enabling unauthorized access or destruction of data. Therefore, in order to prevent such problems from occurring, it is preferable to store the policy determination data and the monitor log in a state encrypted by a user encryption key. The user encryption key may be generated by combining the system encryption key stored in the client 3 and the password of the user (e.g. combined by using hash function). In this case, the system encryption key is to be stored in a part of the client 3 which cannot be accessed by the user. For example, the system encryption key may be stored in a secure memory which can only be accessed by authorized applications or in a high security hardware module (e.g. TPM). Alternatively, there is a method of scrambling the system encryption key data and assembling the scrambled data to the application 31 which manages the policy determination data and the monitor log data (This method may however be less safe). By storing the policy determination data in such an encrypted state, even where a person tampers with the policy determination data, the tampered policy determination data cannot be properly decrypted and access will be denied by the system since the person has neither the system encryption key nor the user password. Furthermore, in a case where the user attempts to maliciously expand his/her user authority, the user cannot achieve this since the user does not know the location of the system encryption key.

FIG. 10 is a sequence diagram showing an exemplary operation of accessing a target document file during an offline mode according to an embodiment of the present invention.

In FIG. 10, in a case where the user attempts to access (e.g., browse, edit, print) the target document file with the client 3, the application 31 requests the user to input the user's user ID and password with respect to the security policy server 1 and acquires the input user ID and password (Step S301).

The application 31 requests the network status determination part 32 to determine the status of the network 2 (Step S302). In a case where the application 31 receives a response from the network status determination part 32 that the client 3 is in an offline mode (Step S303), the application 31 sends a request for user authentication together with a user ID, a password, a document ID, and an access type to the policy determination data obtaining part 35 (Step S304).

The policy determination data obtaining part 35 requests for corresponding policy determination data from the policy determination data storage part 36 (Step S305). The policy determination data storage part 36 searches for policy determination data corresponding to the request, generates a user key, and decodes the policy determination data (Step S306-S308). Then, the policy determination data storage part 36 sends the policy determination data to the policy determination data obtaining part 35 (Step S309).

The policy determination data obtaining part 35 also requests the log management part 37 to record access events (Step S310). The log management part 37 conducts the processes such as log decoding, log checking, log adding, and log encrypting (Steps S311-S314). Then, the log management part 37 reports that processes are completed to the policy determination data obtaining part 35 (Step S315).

Then, the policy determination data obtaining part 35 sends the policy determination data from the policy determination data storage part 36 to the application 31 (Step S316). The application 31 accesses the target document file in accordance with the obtained policy determination data (Step S317).

The application 31 reports the status (result) of the access performed on the target document file (access event) to the log management part 37 (Step S318). The log management part 37 performs log decrypting, log checking, log adding, and log encrypting on the access event and records the access event in the monitor log (Step S319).

Further, the present invention is not limited to these embodiments, but variations and modifications may be made without departing from the scope of the present invention.

The present application is based on Japanese Priority Application No. 2006-028495 filed on Feb. 6, 2006, with the Japanese Patent Office, the entire contents of which are hereby incorporated by reference.

What is claimed is:

1. A document access control system for determining whether to allow a user of a client device to access a target document file stored in the client device according to a security policy set in a server, the system comprising:
a cache timing determination part configured to determine a timing for caching policy determination data corresponding to the target document file stored in the client device, the policy determination data including data indicative of whether access to the target document file is allowed when the client device is in an offline mode and data indicative of a valid period of the policy determination data and a valid count of the policy determination data in a case where access to the target document file is allowed when the client device is in the offline mode;
a policy determination data obtaining part configured to obtain the policy determination data from the server according to a report from the cache timing determination part;
a policy determination data storage part configured to store, in the client device, the obtained policy determination data in correspondence with the target document file;
a file access control part configured to control access to the stored target document file according to the policy determination data stored in the policy determination data storage part in a case where the user of the client device requests access to the target document file when the client device is in the offline mode;
a log management part configured to record log data indicating access to the target document file based on the policy determination data during the offline mode; and
a log data storing part configured to store the log data in an encrypted state, the log data being encrypted with a user encryption key generated by combining a system encryption key and a user password, the system encryption key being secretly stored in the client device and being inaccessible by the user.

2. The document access control system as claimed in claim 1, wherein the cache timing determination part monitors generation of the target document file in the client, and the policy determination data obtaining part obtains the policy determination data corresponding to the generated target document file.

3. The document access control system as claimed in claim 1, wherein the cache timing determination part periodically instructs updating of the policy determination data corresponding to the target document file, and the policy determination data obtaining part obtains the policy determination data corresponding to the target document file.

4. The document access control system as claimed in claim 1, wherein the cache timing determination part receives a designation of the target document file from the user, and the policy determination data obtaining part obtains the policy determination data corresponding to the designated target document file.

5. The document access control system as claimed in claim 4, wherein the designated target document file is designated by designation of a folder including the target document file.

6. The document access control system as claimed in claim 1, wherein the policy determination data obtaining part obtains the policy determination data corresponding to the target document file accessed by the user.

7. The document access control system as claimed in claim 1, further comprising:
a network status determining part for determining whether the client is online with the server; wherein
the access to the target document file is determined based on the policy determination data obtainable by a request to the server when the client is online with the server, and
the access to the target document file is determined based on the policy determination data stored in the policy determination data storage part when the client is offline with the server.

8. The document access control system as claimed in claim 1, wherein the policy determination data include at least one of document ID data corresponding to a target document, user ID data corresponding to the user of the client, access type data, access authorization data, and access condition data.

9. The document access control system as claimed in claim 1, wherein the target document file is encrypted with an encryption key dedicated to the target document file, wherein and the policy determination data include includes data for decrypting the encrypted target document file.

10. The document access control system as claimed in claim 1, wherein the policy determination data are stored in the client in an encrypted state.

11. The document access control system as claimed in claim 10, wherein the policy determination data are encrypted with an encryption key generated by combining data secretly stored in the policy determination data storage part and unique data of the user of the client.

12. The document access control system as claimed in claim 1, wherein the log management part records the time of the access and compares the time of the access with a previous time of access, and the access is denied when the time of access contradicts the previous time of access.

13. The document access control system as claimed in claim 1, wherein the log management part transfers the log data recorded during the offline mode the next time the client is online with the server.

14. A non-transitory computer-readable medium on which a computer-readable program is stored that, when executed by an arithmetic processor, directs the arithmetic processor to perform a document access control method for determining whether to allow a user of a client device to access a target document file stored in the client device according to a security policy set in a server, the method comprising:
a) determining a timing for caching policy determination data corresponding to the target document file stored in a client device, the policy determination data including data indicative of whether access to the target document file is allowed when the client device is in an offline mode and data indicative of a valid period of the policy determination data and a valid count of the policy determination data in a case where access to the target document file is allowed when the client device is in the offline mode;
b) obtaining the policy determination data from the server according to a report generated in step a);
c) storing, in the client device, the obtained policy determination data in correspondence with the target document file;
d) controlling access to the stored target document file according to the policy determination data stored in step c) in a case where a user of the client device requests access to the target document file when the client device is in the offline mode;
e) recording log data indicating access to the target document file based on the policy determination data during the offline mode; and
f) storing the log data in an encrypted state, the log data being encrypted with a user encryption key generated by combining a system encryption key and a user password, the system encryption key being secretly stored in a client device and being inaccessible by the user.

15. A document access control method for determining whether to allow a user of a client device to access a target document file stored in the client device according to a security policy set in a server, the method comprising:
a) determining a timing for caching policy determination data corresponding to the target document file stored in a client device, the policy determination data including data indicative of whether access to the target document file is allowed when the client device is in an offline mode and data indicative of a valid period of the policy determination data and a valid count of the policy determination data in a case where access to the target document file is allowed when the client device is in the offline mode;
b) obtaining the policy determination data from the server according to a report generated in step a);
c) storing, in the client device, the obtained policy determination data in correspondence with the target document file;
d) controlling access to the stored target document file according to the policy determination data stored in step c) in a case where a user of the client device requests access to the target document file when the client device is in an offline mode;
e) recording log data indicating access to the target document file based on the policy determination data during the offline mode; and
f) storing the log data in an encrypted state, the log data being encrypted with a user encryption key generated by combining a system encryption key and a user password, the system encryption key being secretly stored in a client device and being inaccessible by the user.

* * * * *